(12) United States Patent
Johnson et al.

(10) Patent No.: US 9,928,335 B2
(45) Date of Patent: Mar. 27, 2018

(54) TEMPERATURE-COMPLIANT INTEGRATED CIRCUITS

(71) Applicant: GLOBAL FOUNDRIES INC., Grand Cayman (KY)

(72) Inventors: James M. Johnson, Milton, VT (US); Sungjae Lee, Burlington, VT (US); Lan Luo, South Burlington, VT (US); Scott K. Springer, Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 360 days.

(21) Appl. No.: 14/728,100

(22) Filed: Jun. 2, 2015

(65) Prior Publication Data
US 2016/0357898 A1 Dec. 8, 2016

(51) Int. Cl.
*G06F 17/50* (2006.01)
(52) U.S. Cl.
CPC .................. *G06F 17/5081* (2013.01)
(58) Field of Classification Search
CPC .................. G06F 17/5081; G06F 2217/80
See application file for complete search history.

(56) References Cited

U.S. PATENT DOCUMENTS

| | | | |
|---|---|---|---|
| 7,655,944 | B1 | 2/2010 | Darwish |
| 7,733,157 | B2 | 6/2010 | Brederlow et al. |
| 7,923,266 | B2 | 4/2011 | Thijs et al. |
| 8,701,066 | B1 | 4/2014 | Lo et al. |
| 8,816,397 | B2 | 8/2014 | Darwish et al. |
| 2013/0103351 | A1 | 4/2013 | Huang et al. |
| 2014/0195183 | A1 | 7/2014 | Rajput et al. |
| 2014/0310676 | A1 | 10/2014 | Haensch et al. |

OTHER PUBLICATIONS

Hai et al., Journal Article, entitled, "Experimental investigation of self heating effect (SHE) in multiple-fin SOI FinFETs" published in Semiconductor Science and Technology, vol. 29, Issue: 11, 7 Pages in Nov. 2014.
Anonoymous, "Method of Modeling and Enabling Self-Heating Effect in Semiconductor Devices", IP.com Disclosure No. IPCOM000237687D, Publication Date: Jul. 2, 2014, 4 pages.

*Primary Examiner* — Vuthe Siek
*Assistant Examiner* — Aric Lin
(74) *Attorney, Agent, or Firm* — David Cain; Hoffman Warnick LLC

(57) ABSTRACT

Aspects of the present disclosure include a computer-implemented method for designing a temperature-compliant integrated circuit (IC). The method can include: calculating a thermal resistance of an IC layout, the IC layout having an area-dependent thermal conductance, a fin thermal conductance, and a gate thermal conductance each based on a device geometry of a plurality of transistors in the IC layout; calculating a self-heating temperature as directly proportional to the thermal resistance; comparing the self-heating temperature with a threshold temperature; in response to the self-heating temperature exceeding the threshold temperature, automatically modifying the device geometry of the IC layout to reduce at least one of the area term and the perimeter term, thereby reducing the self-heating temperature of the IC layout; and designing the temperature-compliant IC layout by repeating the calculating and automatically modifying steps until the self-heating temperature does not exceed the threshold temperature.

19 Claims, 6 Drawing Sheets

TEMPERATURE-COMPLIANT INTEGRATED CIRCUITS

BACKGROUND

Aspects of the invention relate generally to the design of temperature-compliant integrated circuits (ICs). More specifically, embodiments of the present disclosure can provide a method, system, and program product for designing an IC layout to predict temperature changes from self-heating, and modifies the IC layout automatically and repeatedly to determine whether the temperature increase of a fabricated IC will remain below a self-heating threshold during operation.

Each IC of a particular device can be made up of billions of interconnected devices, such as transistors, resistors, capacitors, and diodes, located on one or more chips of semiconductor substrate material. The proposed design of an IC can be represented as an IC layout, otherwise known as a "mask design" or "mask layout," in which a complete integrated circuit is represented as a group of simple planar and/or three-dimensional geometric shapes. Computer-implemented solutions such as manufacturing models can at least partially govern the design, fabrication, and other processing steps of IC components used in a given device. Conventional manufacturing models may rely upon predicted values of temperature and/or voltage during deployment. These predicted values are also known as the specification, design, and/or nominal operating temperature or voltage. These temperatures and/or voltages are typically set at the time of design, based on the IC layout, to predict operating conditions such as ranges of temperatures and voltages of the IC after manufacture and deployment.

Actual operating conditions of a device can vary significantly from design conditions. These variations can alter the field viability of a device which includes ICs therein. Thus, the true quality of a device may differ from what the manufacturing model of its manufacturing line predicts. In some cases, variability in actual operating temperatures can stem from "self-heating" of the integrated circuit. Self-heating refers to a phenomenon in which the temperature of an IC increases during operation because of its underlying physical properties, such as the size, shape, and material composition of substances which make up the IC. As ICs become smaller and power density per area increases, temperature increases caused from self-heating continue to grow and in some cases can become greater than their predicted or desired levels. Thus, modeling and reducing the effects of self-heating plays an important role in managing the lifespan and quality of products which include one or more ICs.

SUMMARY

A first aspect of the present disclosure provides a computer-implemented method for designing a temperature-compliant integrated circuit (IC), the method comprising: calculating a thermal resistance of an IC layout, the IC layout having an area-dependent thermal conductance, a gate thermal conductance, and a fin thermal conductance each based on a device geometry of a plurality of transistors in the IC layout, wherein the calculating includes: calculating an area term for the IC layout, the area term being a product of a number of transistor gates, a number of fins per transistor gate, and the area-dependent thermal conductance of the IC layout, calculating a perimeter term for the IC layout, the perimeter term being a product of the number of transistor gates and the gate thermal conductance of the IC layout, added to a product of the number of fins per transistor gate and the fin thermal conductance of the IC layout, calculating a thermal conductance of the IC layout as a sum of the area term and the perimeter term, and calculating the thermal resistance of the IC layout as an inverse of the thermal conductance; calculating a self-heating temperature of the IC layout as directly proportional to the calculated thermal resistance; comparing the self-heating temperature with a threshold temperature; in response to the self-heating temperature exceeding the threshold temperature, automatically modifying the device geometry of the IC layout to reduce at least one of the area term and the perimeter term, thereby reducing the self-heating temperature of the IC layout; and designing the temperature-compliant IC layout by repeating the calculating and automatically modifying steps until the self-heating temperature does not exceed the threshold temperature.

A second aspect of the present disclosure provides a system for designing a temperature-compliant integrated circuit (IC), which can include: logic configured to calculate a thermal resistance of an IC layout, the IC layout having an area-dependent thermal conductance, a gate thermal conductance, and a fin thermal conductance each based on a device geometry of a plurality of transistors in the IC layout, wherein the calculating includes: calculating an area term for the IC layout, the area term being a product of a number of transistor gates, a number of fins per transistor gate, and the transistor area-dependent thermal conductance of the IC layout, calculating a perimeter term for the IC layout, the perimeter term being a product of the number of transistor gates and the gate thermal conductance of the IC layout, added to a product of the number of fins per transistor gate and the fin thermal conductance of the IC layout, calculating a thermal conductance of the IC layout as a sum of the area term and the perimeter term, calculating the thermal resistance of the IC layout as an inverse of the thermal conductance, calculating a self-heating temperature of the IC layout as directly proportional to the calculated thermal resistance, and comparing the self-heating temperature with a threshold temperature; an IC layout editor for, in response to the self-heating temperature exceeding the threshold temperature, automatically modifying the device geometry of the IC layout to reduce at least one of the area term and the perimeter term, thereby reducing the self-heating temperature of the IC layout; and designing the temperature-compliant IC layout by causing the logic to repeat the calculating steps, and repeating the automatic modifying of the IC layout, until the self-heating temperature does not exceed the threshold temperature.

A third aspect of the present disclosure provides a program product stored on a computer readable storage medium, the program product operative to design a temperature-compliant integrated circuit (IC) when executed, the computer readable storage medium comprising program code for: calculating a thermal resistance of an IC layout, the IC layout having an area-dependent thermal conductance, a gate thermal conductance, and a fin thermal conductance each based on a device geometry of a plurality of transistors in the IC layout, wherein the calculating includes: calculating an area term for the IC layout, the area term being a product of a number of transistor gates, a number of fins per transistor gate, and the area-dependent thermal conductance of the IC layout, calculating a perimeter term for the IC layout, the perimeter term being a product of the number of transistor gates and the gate thermal conductance of the IC layout, added to a product of the number of fins per transistor gate and the fin thermal conductance of the IC layout, calculating a thermal conductance of the IC layout as a sum of the area term and the perimeter term, and calculating the thermal resistance of the IC layout as an inverse of the thermal conductance; calculating a self-heating temperature of the IC layout as directly proportional to the calculated thermal resistance; comparing the self-heating temperature with a threshold temperature; in response to the self-heating temperature exceeding the threshold temperature, automatically modifying the device geometry of the IC layout to reduce at least one of the area term and the perimeter term, thereby reducing the self-heating temperature of the IC layout; and designing the temperature-compliant IC layout by repeating the calculating and automatically modifying steps until the self-heating temperature does not exceed the threshold temperature.

BRIEF DESCRIPTION OF THE DRAWINGS

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
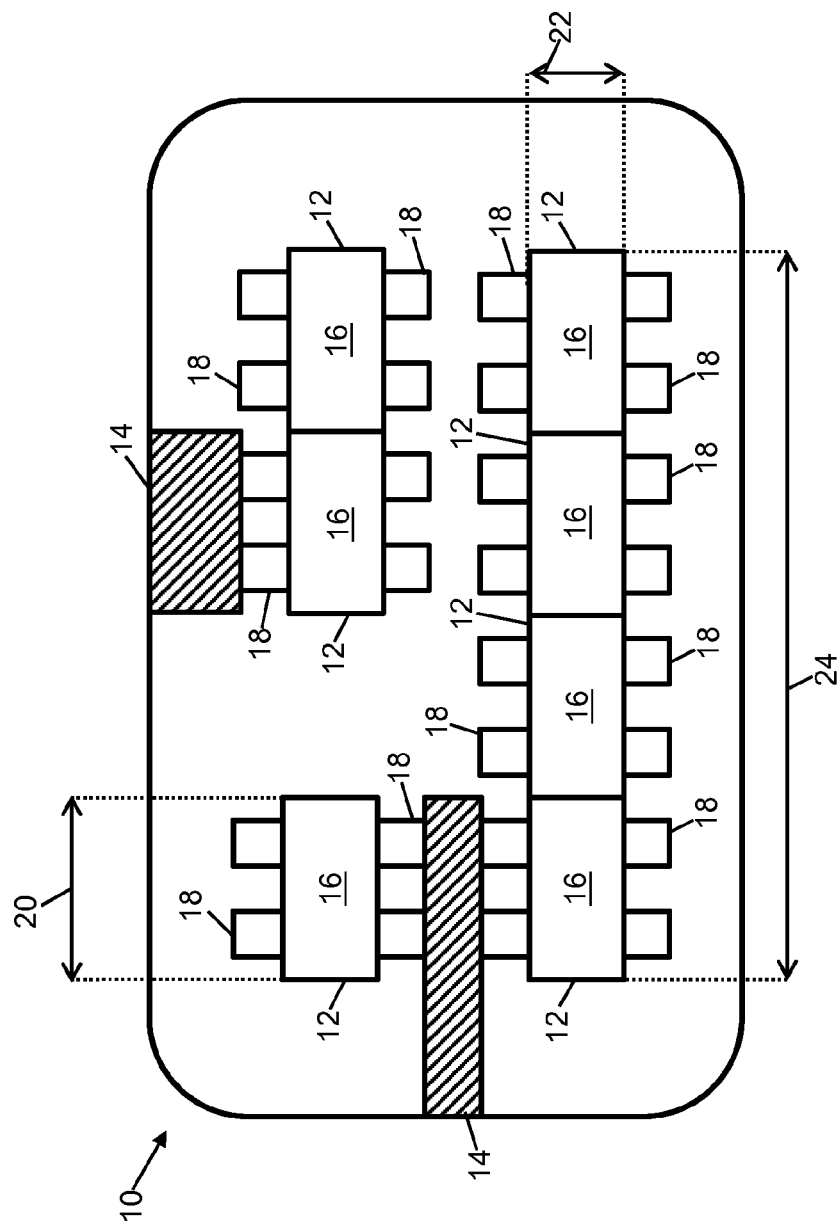
FIG. 1 provides a plan view of element shapes in an illustrative IC layout according to an embodiment of the present disclosure.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the present disclosure provide a computer-implemented method for designing a temperature-compliant integrated circuit (IC), particularly for ICs which include FinFET transistors. A FinFET can include a semiconductor structure etched into a "fin" shaped body, with one side of the fin acting as a source terminal and an opposing side of the fin acting as a drain terminal. A gate structure, which may be at least partially conductive, can be formed over one or more of the semiconductor fins. In a FinFET, each gate can affect channel formation in only one corresponding semiconductor fin or in multiple semiconductor fins. To model and reduce self-heating in a proposed IC layout, embodiments of the present disclosure can calculate a thermal resistance of the IC layout using a combination of properties. Thermal resistance generally refers to a heat flow of a circuit from heat-dependent effects, such as self-heating of the circuit during operation. The properties contributing to thermal resistance can include device geometries in the IC, operational characteristics during operation such as power dissipated in each transistor, and other properties related to the size, shape, position, and number of elements in an IC layout.

Given a particular IC layout, embodiments of the present disclosure can extract, calculate, and/or receive other modeled values of an area-dependent thermal conductance, and two parameters contributing to a perimeter dependent thermal conductance: a gate thermal conductance, and a fin thermal conductance. Each of these parameters can be derived from a device geometry of transistors in the IC layout. Thermal conductance generally refers to a component's ability to transmit heat therethrough, and is inversely proportional to thermal resistance. Mathematically, thermal conductance can be expressed as the component's "thermal conductivity" (derived from the underlying properties of a material), multiplied by the component's cross-sectional area (i.e., in a direction perpendicular to heat flow) and divided by its length (i.e., in a direction or path parallel to heat flow). For more complicated structures, an electrical component's total conductance may be expressed as a group of partial conductance values related to spatial attributes of the complete structure and its subcomponents. In the case of a FinFET transistor, the "area-dependent thermal conductance" can represent the heat flow through a transistor in an upward and downward direction, which is attributable to the total size of a given FinFET and therefore dependent upon both the fins and gates. The perimeter-dependent aspects of an IC layouts thermal conductance may be derived from two contributing parameters. One parameter, the "gate thermal conductance," represents a separate thermal conductivity of a FinFET's gate structure, accounting for lateral heat flow across the gate of one or more FinFET transistors. The gate thermal conductance of an IC layout can be calculated without reference to the shape or number of contacted semiconductor fins. Another parameter, the "fin thermal conductance" of a FinFET, represents an independent thermal conductivity of fins in a FinFET, generally reflecting lateral heat flow across the fins of one or more FinFET transistors. The fin thermal conductance of an IC layout can be calculated without reference to the properties of each gate included in the IC layout. Initial values of transistor area-based conductance, gate thermal conductance, and fin thermal conductance can be derived from and/or calculated with mathematical models generally known to those of ordinary skill in the art, such as the general formula for thermal conductance described herein.

The thermal conductance of a complete IC layout can be expressed as the sum of an area term and a perimeter term for the IC layout. The area term can be calculated as a multiplicative product of: the total number of transistor gates in the IC layout, the number of fins per gate in the FinFET device, and area-dependent thermal conductance of the IC layout. The perimeter term can be calculated as a multiplicative product of a total number of transistor gates in the IC layout and the gate thermal conductance of the IC layout, added to a multiplicative product of the number of fins per transistor gate and the fin thermal conductance of the IC layout. A thermal resistance of the IC layout can be expressed as an inverse (i.e., multiplicative reciprocal) of the thermal conductance. The thermal resistance, in turn, can be directly proportional to the degree of self-heating or equal to "self-heating temperature" of the IC layout when multiplied with an amount of dissipated power. Embodiments of the present disclosure can then automatically modify the device geometry of the IC to reduce the perimeter term or the area term for ICs where the self-heating temperature exceeds a predetermined threshold.

Turning to FIG. 1, a plan view of an IC layout 10 with multiple transistor shapes ("transistors") 12, representing a group of FinFETs is shown. In the form of an IC layout, each shape models and corresponds to a component produced in a manufacturing process using the design of the IC layout. Throughout the description of IC layout 10, each shape is described by reference to the component, material, layer, etc., of a manufactured IC corresponding to a shape in IC layout 10. Each transistor 12 can be connected to other components of IC layout 10 and/or other structures by way of contacts 14. In a fabricated IC, contacts 14 can be composed of electrically conductive metals (e.g., copper, aluminum, silver, etc.) positioned in the same plane as transistors 12 or positioned vertically above or below transistors 12 to connect to other contacts or components (not shown) positioned above or below the layer depicted in FIG. 1. Each transistor 12 can include a gate structure ("gate") 16 positioned over and contacting one or more fins 18. Gates 16 can alternatively be known as fingers in different contexts or applications. Although only two contacts 14 are shown in FIG. 1 as an example, it is understood that each fin 18 can connect to a respective contact 14 in the same horizontal plane as each transistor 12 or in a different horizontal plane. Seven transistors 12 are shown in IC layout 10 as an example, but it is understood that a single IC layout 10 can include many more transistors 12, e.g., thousands, millions, or billions of transistors 12 therein. It is also understood that IC layout 10 of FIG. 1 can represent only part of a larger IC layout.

Electrical currents frequently pass through transistors 12, via gates 16 and/or fins 18, during operation of a fabricated IC. This electrical activity within the material composition of transistors 12 can cause the temperature of each transistor 12 to increase during operation due to self-heating. The amount of self-heating in each transistor 12 can be directly proportional to the thermal resistance of each transistor 12 based on the amount of power dissipated to represent the increased temperature. Self-heating in an IC is therefore proportional to thermal resistance, hence inversely proportional to thermal conductance. As described elsewhere herein, these properties can at least partially derive from the geometrical features of each transistor 12 in IC layout 10. The properties of transistors 12 in IC layout 10 can relate to each transistor 12 individually and/or a group of transistors 12. One transistor 12, for example, can have a width 20 (i.e., distance between two ends in a direction perpendicular to fin 18) and a length 22 (i.e., distance between two ends in a direction parallel with fin 18. A group of transistors 12 positioned side-by-side can have a total width 24 approximately equal to the number of gates 16 multiplied by the number of transistors 12 in the group.

Figure 2:
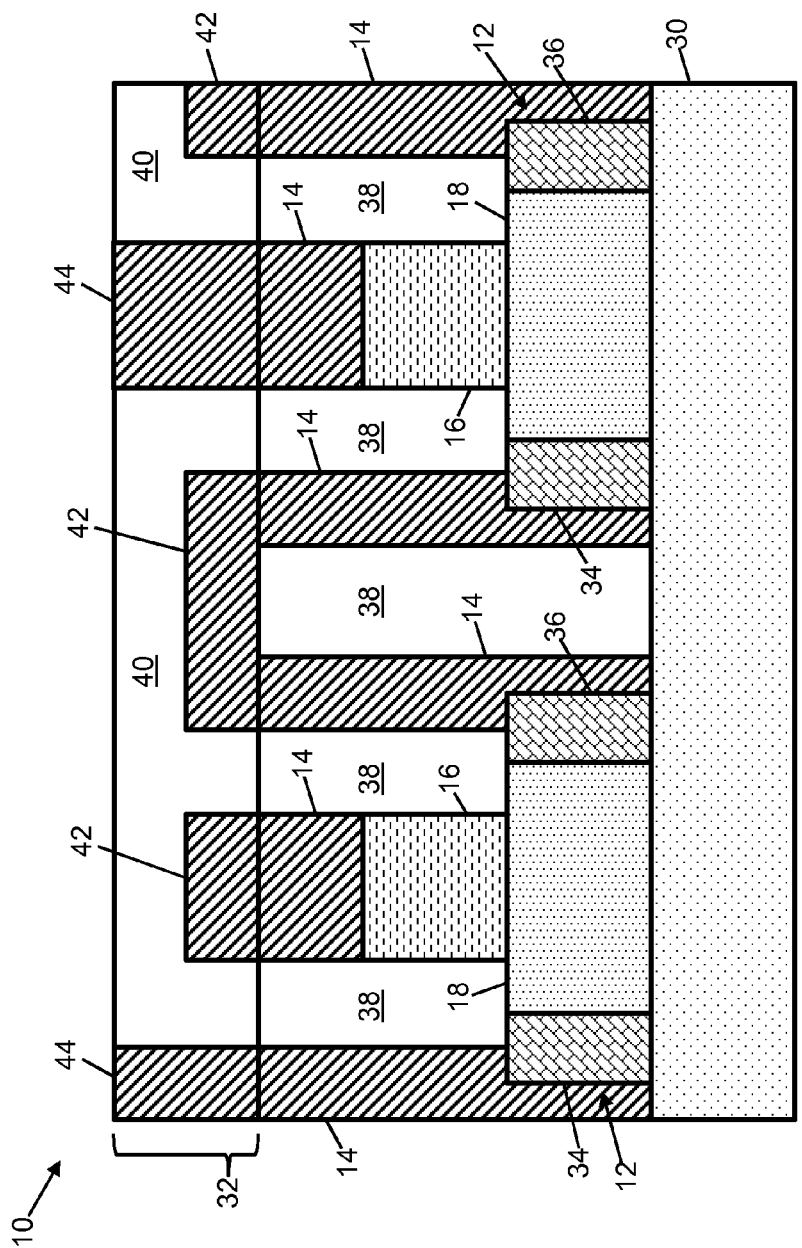
FIG. 2 provides a partial cross sectional view of element shapes in an illustrative IC layout according to an embodiment of the present disclosure.

Turning to FIG. 2, a cross-sectional side view of IC layout 10 is shown to further illustrate the relationship between components of IC layout 10 in three-dimensional space. IC layout 10 can include a substrate 30, fabricated as a layer of semiconductor material, which can include without limitation: silicon, germanium, silicon carbide, and substances consisting essentially of one or more compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Other suitable substances can include II-VI compound semiconductors having a composition $Zn_{A1}Cd_{A2}Se_{B1}Te_{B2}$, where A1, A2, B1, and B2 are relative proportions each greater than or equal to zero and A1+A2+B1+B2=1 (1 being a total mole quantity). Substrate 30 can be provided as a bulk substrate or as part of a silicon-on-insulator (SOI) wafer. Each transistor 12 can be formed on an upper surface of substrate 30, with several contacts 14 extending vertically to electrically connect each transistor 12 to a back end layer 32 positioned above transistors 12. Source contacts 34 and drain contacts 36, each formed of an electrically conductive material, may be formed over and in contact with opposing ends of each fin 18. IC layout 10 can also include an insulator layer 38 for impeding electrical communication between non-adjacent or disconnected components (e.g., to prevent electrical shorting), and can be composed of any insulating material such as $SiO_2$ or a dielectric having a high dielectric constant, which may be, for example, above 3.9. In some situations, the fabricated insulator layer 38 can be composed of an oxide substance. Materials appropriate for the composition of insulator layer 38 may include, for example, silicon dioxide ($SiO_2$), silicon nitride (SiN), hafnium oxide ($HfO_2$), alumina ($Al_2O_3$), yttrium oxide ($Y_2O_3$), tantalum oxide ($Ta_2O_5$), titanium dioxide ($TiO_2$), praseodymium oxide ($Pr_2O_3$), zirconium oxide ($ZrO_2$), erbium oxide ($ErO_x$), and other currently known or later developed materials having similar properties.

Back end layer 32 can be one of several "metal layers" in IC layout 10. Back end layer 32, even when referred to as a "metal layer," can include an interlayer dielectric 40 therein. Further, back end layer 40 can be a "lower metal layer." The term "lower metal layer" can refer to a type of back end layer 32 separated from a different silicon layer (not shown) by zero or more other back end layers. In other embodiments, back end layer 32 can be distal to a silicon layer and adjoin a different back end layer on only one side. The number of back end layers 32 in IC layout 10 can vary between embodiments, and may include, for example, four to six layers or as many as, in a further example, sixteen layers. In any event, back end layer 32 can include a metal wire 42 for laterally connecting some contacts 14 to other IC components. Each metal wire 42 can also have a corresponding width which may be equal to or less than, e.g., the total width of back end layer 32. Back end layer 32 can additionally or alternatively include vias 44 formed from the same conductive material as contacts 14 or a different conductive material. Each via 44 can connect one layer of an IC to a different, vertically separated layer (not shown) in IC layout 10, and can be separated from interlayer dielectric 40 by a liner material (not shown) contacting an outer perimeter of via 44. IC layout 10 depicted in FIGS. 1 and 2 is used herein as an example structure for designing a temperature-compliant IC according to embodiments of the present disclosure. However, it is understood that embodiments of the present disclosure can be applied to any conceivable type of IC layout 10 without departing from the principles and process flow(s) described.

Figure 3:
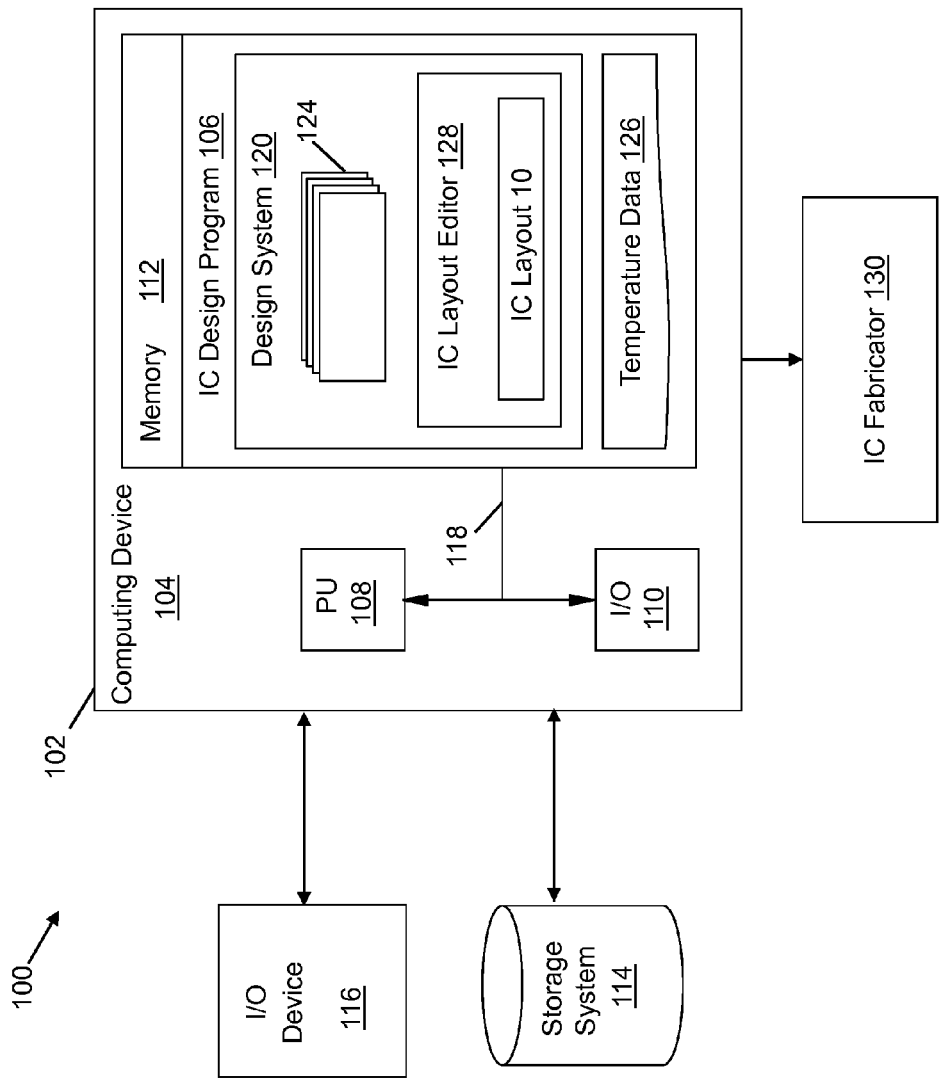
FIG. 3 provides a schematic of an illustrative environment for performing a method or operating a system according to embodiments of the present disclosure.

Turning now to FIG. 3, an illustrative environment 100 for implementing the method and/or system described herein is shown. The method and/or system may be coded as a set of instructions on removable or hard media for use by a general-purpose or special-purpose computer, and thus may, in embodiments, include a computer program product. A computer system 102 of environment 100, which can include or be embodied as computing device 104, is shown including a processing unit (PU) 108 (e.g., one or more processors), an I/O component 110, a memory 112 (e.g., a storage hierarchy), an external storage system 114, an input/output (I/O) device 116 (e.g., one or more I/O interfaces and/or devices), and a communications pathway 118. In general, processing unit 108 can execute program code, such as IC design program 106, which is at least partially fixed in memory 112. While executing program code, processing unit 108 can process data, which can result in reading and/or writing transformed data from/to memory 112 and/or I/O component 110 for further processing. Pathway 118 provides a communications link between each of the components in environment 100. I/O component 110 can comprise one or more human I/O devices, which enable a human user to interact with computer system 102 and/or one or more communications devices to enable a system user to communicate with the computer system 102 using any type of communications link. To this extent, IC design program 106 can manage a set of interfaces (e.g., graphical user interface(s), application program interface(s), etc.) that enable human and/or system users to interact with IC design program 106. Further, IC design program 106 can manage (e.g., store, retrieve, create, manipulate, organize, present, etc.) data, through several modules contained within a design system 120.

In any event, computer system 102 can comprise one or more computing articles of manufacture (e.g., computing devices 104) capable of executing program code, such as IC design program 106, installed thereon. As used herein, it is understood that "program code" means any collection of instructions, in any language, code, or notation, that cause a computing device having an information processing capability to perform a particular function either directly or after any combination of the following: (a) conversion to another language, code or notation; (b) reproduction in a different material form; and/or (c) decompression. To this extent, IC design program 106 can be embodied as any combination of system software and/or application software.

Further, IC design program 106 can include a design system 120. In this case, various modules of design system 120 can enable computer system 102 to perform a set of tasks used by IC design program 106, and can be separately developed and/or implemented apart from other portions of IC design program 106. As used herein, the term "module" means program code that enables computer system 102 to implement the functionality described in conjunction therewith using any solution. When fixed in memory 112 of computing device 104 which includes processing unit 108, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computing device 104.

Design system 120 can include several modules 124 for performing various functions. For example, a determinator module can issue instructions, commands, etc. based on data stored within memory 112 of computing device 104, or other pieces of information provided thereto. A calculator module can perform mathematical computations, and a comparator module can compare two or more data quantities. Electrical signals or responses transmitted to computing device 104 can be translated and/or encoded and stored in memory 112 as temperature data 126. Each module discussed herein can obtain and/or operate on data from exterior components, units, systems, etc. or from memory 112 of computing device 104. In a particular example, the data provided to design system 120 of IC design program 106 can also be processed within, e.g., an IC layout editor 128 of design system 120. IC layout editor 128 can include and/or operate on IC layouts 10 which can include a proposed product design, a group of components and/or dimensions, modeled connections to other components of an IC, etc., for a given product or group of products, such as those described elsewhere herein with respect to FIGS. 1 and 2.

Computer system 102 and/or computing device 104 can be operatively connected to an IC fabricator 130. IC fabricator 130 can be in the form of any currently known or later developed instrument(s) for the fabrication, processing, and/or modifying of an IC based on IC layout 10. IC fabricator 130 can be in the form of a device capable of depositing, removing, patterning, and/or otherwise processing the elements of an IC structure. As non-limiting examples, IC fabricator 130 can include a deposition system (e.g., a laser and vacuum chamber used to form materials on an exposed surface), an etchant bath, a plasma etcher, a chemical mechanical polishing (CMP) tool, a patterning device, etc. Computing device 104 and IC fabricator 130 can be operatively connected to each other by way of a wired connection, wireless network, or other networking scheme and/or instrument. The operative connection between computing device 104 and IC fabricator 130 can allow computing device 104 to convey instructions to activate, deactivate, and/or control the operation of one or both devices.

Where computer system 102 comprises multiple computing devices 104 and/or other computing devices, each device may have only a portion of IC design program 106 and/or design system 120 fixed thereon (e.g., one or more modules). However, it is understood that computer system 102 and IC design program 106 are only representative of various possible equivalent computer systems that may perform a process described herein. To this extent, in other embodiments, the functionality provided by computer system 102 and IC design program 106 can be at least partially implemented by one or more devices that include any combination of general and/or specific purpose hardware with or without program code. In each embodiment, the hardware and program code, if included, can be created using standard engineering and programming techniques, respectively.

Regardless, when computer system 102 includes multiple computing devices, the devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or use any combination of various types of transmission techniques and protocols. Computer system 102 can obtain or provide data, such as data stored in memory 112, using any solution. For example, computer system 102 can generate and/or be used to generate data from one or more data stores, receive data from another system, send data to another system, etc.

Figure 4:
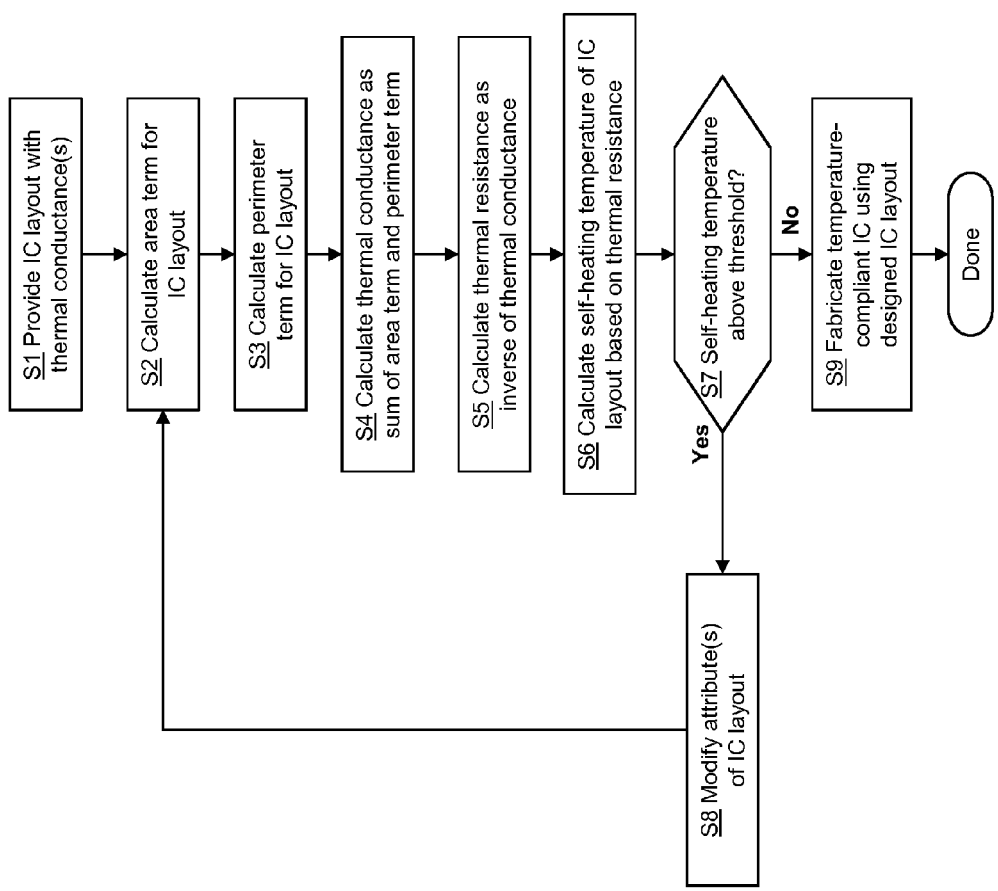
FIG. 4 shows an illustrative flow diagram of processes for designing a temperature-compliant IC according to embodiments of the present disclosure.

Turning to FIGS. 3 and 4 together, an illustrative flow diagram for designing a temperature-compliant IC according to embodiments of the present disclosure is shown. At step S1, a user, system, and/or third party can provide IC layout 10 which includes transistors 12 (FIGS. 1, 2) therein. Each transistor 12 of IC layout 10 can include geometrical features which contribute to the thermal conductance or thermal resistance of the complete IC layout 10. Embodiments of the present disclosure can calculate a total thermal conductance of IC layout 10 (e.g., with mathematical models) in further process steps. Specifically, the process flow can include four successive steps S2 through S5 for calculating a thermal conductance of IC layout 10 from the geometrical features of elements represented by shapes therein. The term "thermal conductance" is a mathematical inverse of thermal resistance, and represents the heat flow throughout IC layout 10.

Aspects of the present disclosure include modeling thermal conductance as the sum of an area-based component, known as the "area term" and a perimeter-based component, known as the "perimeter term." At step S2, modules 124 of design system 120 can calculate the area term for IC layout 10. The calculated area term can represent a heat flow or conduction in upward and downward direction from the surface area of transistors 12 in IC layout 10. Regardless of whether conventional models account for the contribution of transistor areas and perimeters to self-heating, the area term calculated in step S2 can be mathematically distinct from other models by including additional and/or different combinations of variables. Specifically, the area term can be expressed as a multiplicative product of the total number of transistor gates 16 (FIG. 1) in IC layout 10, the total number of fins 18 (FIG. 1) per transistor gate 18 in IC layout 10, and the area-dependent thermal conductance parameter of IC layout 10 described elsewhere herein. Mathematically, the area term can be represented according to an equation:

Area Term=(Nfin)·(NF)·($G_{thArea}$), in which "Nfin" represents the number of fins 18 per transistor gate 16 in IC layout 10, "NF" represents the number of gates (or "fingers") 16 in IC layout 10, and $G_{thArea}$ represents the area-dependent thermal conductance of IC layout 10.

In step S3, modules 124 of design system 120 can calculate the perimeter term for IC layout 10. The calculated perimeter term can represent a lateral heat flow from the perimeter of transistors 12 in IC layout 10 (FIG. 1). The perimeter term can be modeled as a multiplicative product of the number of transistor gates 16 (FIG. 1) in IC layout 10 and the thermal conductance (for lateral heat flow along gates) of IC layout 10, discussed herein, added to a multiplicative product of the number of fins 18 per transistor gate 16 and the thermal conductance (for lateral heat flow along fins) of IC layout 10, also described elsewhere herein. The perimeter term can be represented according to an equation:

Perimeter Term=(Nfin·$G_{thNfin}$)+(NF·$G_{thNF}$), in which "Nfin" represents the number of fins 18 per transistor gate 16 in IC layout 10, "NF" represents the number of gates (or "fingers") 16 in IC layout 10, $G_{thNfin}$ represents the fin thermal conductance (quantifying lateral heat flow along fins) of IC layout 10, and $G_{thNF}$ represents the gate thermal conductance (quantifying lateral heat flow along gates) of IC layout 10.

Proceeding to step S4, modules 124 of design system 120 can calculate a thermal conductance for IC layout 10 by adding the area term of step S2 to the perimeter term of step S3. Expressed mathematically, the thermal conductance of IC layout 10 can be:

$G_{th}$=(Nfin·NF·$G_{thArea}$)+((NFin·$G_{thNfin}$)+(NF·$G_{thNF}$)), in which $G_{th}$ represents the thermal conductance of IC layout 10, and the other variables in the expression are defined according to their base formulas as discussed elsewhere herein. In step S5, modules 124 can calculate the thermal resistance of IC layout 10 as an inverse of the calculated thermal conductance. By extension, the thermal resistance can be expressed mathematically as:

$$R_{th} = \frac{1}{G_{th}} = \frac{1}{(Nfin \cdot NF \cdot G_{thArea}) + ((Nfin \cdot G_{thNfin}) + (NF \cdot G_{thNF}))},$$

where $R_{th}$ represents the thermal resistance of IC layout 10. The resulting thermal resistance $R_{th}$, calculated according to embodiments of the present disclosure, can indicate whether an IC fabricated with IC layout 10 will be temperature-compliant, as discussed herein.

In step S6, modules 124 of design system 120 can calculate a self-heating temperature (i.e., a projected temperature increase from self-heating) of IC layout 10. The self-heating temperature can be directly proportional to the thermal resistance calculated in step S5, and can be expressed according to any currently known or later developed approach for relating temperature changes to the thermal resistance of components in IC layout 10. In an example embodiment, the self-heating temperature calculated in step S6 can be expressed as a multiplicative product of the thermal resistance of IC layout 10, the number of transistor gates 16 (FIG. 1) in IC layout 10, the number of fins 18 (FIG. 1) per transistor gate, and an amount of power dissipated in each fin 18 during operation. Electrical components will dissipate power as currents passes therethrough, and the amount of power dissipated can be expressed as a measure of current (measured, e.g., in amperes (A)) multiplied by the voltage (measured, e.g., in ohms (V)) applied across the component. To determine amount of power dissipated in each fin, the voltage applied cross the fin can be multiplied with the current passing through the fin. To calculate the temperature increase due to self-heating, the power dissipated in each fin 18 can be multiplied by total number of transistor gates 16 in IC layout 10, the number of fins 18 per transistor gate, and the thermal resistance calculated in step S5. An equation for calculating the temperature increase due to self-heating can therefore be expressed as:

ΔT=$R_{th}$($P_{diss,Fin}$·NF·Nfin), in which ΔT represents the self-heating temperature or the amount of temperature increase due to self-heating, $R_{th}$ represents the thermal resistance of the IC layout, $P_{diss,Fin}$ represents a thermal power dissipated in each fin, NF represents the number of gates (or "fingers") 16 in the IC layout, and Nfin represents the number of fins per transistor gate in the IC layout.

At step S7, modules 124 of design system 120 can compare the calculated self-heating temperature of step S6 with a predetermined self-heating threshold. The self-heating threshold can be a user-defined or automatically calculated maximum amount of self-heating permissible in an IC fabricated using IC layout 10. In an embodiment, the comparing can include simulating IC layout 10 to determine whether IC layout 10 would be operable if fabricated, and/or whether the IC layout 10 exhibits the calculated self-heating temperature. The self-heating threshold used for comparing in step S7 can be retained, e.g., in memory 112 or storage system 114 of computer system 102, optionally as part of temperature data 126. In addition, embodiments of the present disclosure can apply multiple self-heating thresholds to IC layout 10 or portions thereof simultaneously or successively, and only one self-heating temperature is described herein as an example.

In some situations, modules 124 of design system 120 may determine that the self-heating temperature of IC layout 10 exceeds the self-heating threshold. In this scenario (i.e., "yes" at step S7), the flow can proceed to a step S8 of modifying one or more attributes of IC layout 10. The modifying of IC layout 10 can be performed automatically using IC layout editor 128. For example, IC layout editor 128 can change the device geometries of one or more fin(s) 18 and/or transistors 12, e.g., by increasing and/or decreasing the widths, heights, etc., of transistors 12 in IC layout 10. In an embodiment, a user can control IC layout editor 128 directly, e.g., through I/O device 116, to manually change one or more properties of IC layout 10. In another embodiment, IC layout editor 128 can include predetermined instructions, logic, etc., for automatically selecting transistors 12 in IC layout 10 to modify to change the widths, heights, etc., of transistors 12 or other features in IC layout 10. It is also understood that other alternative embodiments can allow users to control or select some modifications to IC layout 10 while other changes are provided automatically via instructions encoded in IC layout editor 128.

The modifications to IC layout 10 in step S8 can increase the thermal conductance by the area term of step S2 and/or the perimeter term of step S3, and therefore reduce the thermal resistance of IC layout 10. In addition or alternatively, IC layout editor 128 can propose changes to the design of back end layer 32, e.g., increasing the number of metal wires 42 or vias 44 in IC layout 10 in order to provide additional heat flow path through back end, increasing the spacing or "white area" between transistors 12 in at least part of IC layout 10, changing the device bias (e.g., the voltage needed to form a conductive channel between source and drain contacts 34, 36 (FIG. 2)), etc. After IC layout 10 is modified in step S8, the process can repeat by returning to steps S2 through S6 to recalculate the thermal resistance of the modified IC layout 10. It is thus understood that designing a temperature-compliant IC layout can include repeating steps S2 through S6 and the automatic modification in step S8 until the self-heating temperature of IC layout 10 does not exceed the self-heating threshold.

In the event that modules 124 of design system 120 determine the self-heating temperature to be below the self-heating threshold (i.e., "no" at step S7), the process flow can proceed to step S9 of fabricating an IC using fabricator 130 and IC layout 10. Specifically, computing system 102 can provide the temperature-compliant IC layout 10 to fabricator 130 to fabricate an IC which exhibits a self-heating temperature below the self-heating threshold during operation. The method can then complete ("done"), and/or a new IC layout 10 can be provided and the process can repeat for a different IC layout 10.

Figure 5:
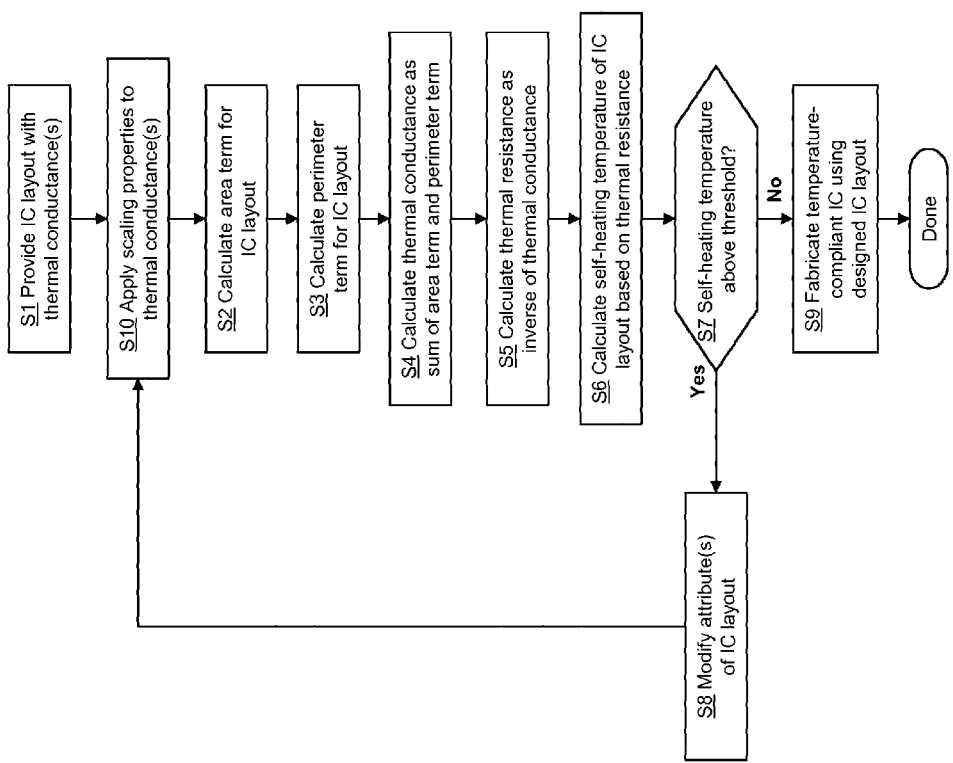
FIG. 5 shows an alternative flow diagram of processes for designing a temperature-compliant IC according to embodiments of the present disclosure.

Referring to FIGS. 3 and 5 together, an alternative process flow for designing temperature-compliant ICs is shown. More specifically, embodiments of the present disclosure can include modifying the area-dependent thermal conductance, and perimeter-dependent thermal conductance parameters (i.e., gate thermal conductance and fin thermal conductance) of IC layout 10 before calculating the self-heating temperature of IC layout in steps S2 through S6. A modified process flow can include an additional step S10 of multiplying the area-dependent and perimeter-dependent thermal conductance parameters (collectively, "shape thermal conductances"), by one or more scaling factors based on other properties of IC layout 10.

Figure 6:
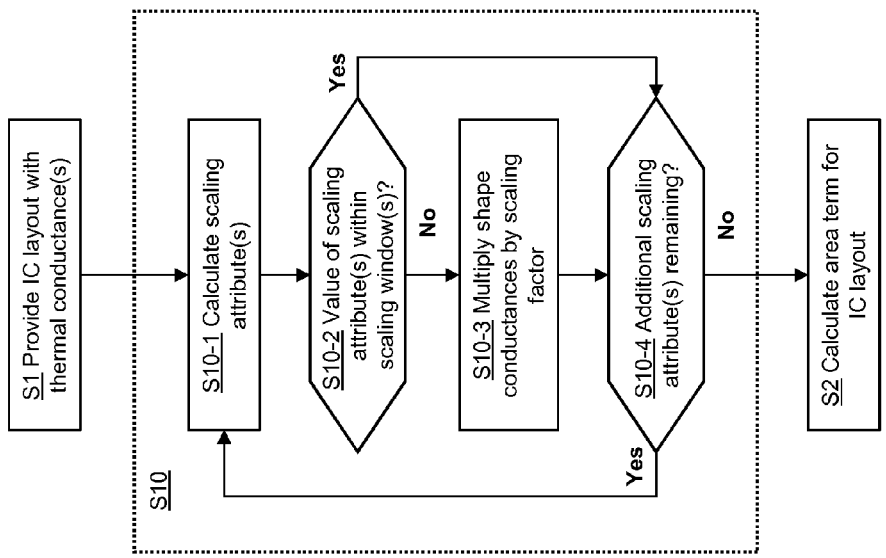
FIG. 6 shows an illustrative flow diagram of sub-processes for designing a temperature-compliant IC according to embodiments of the present disclosure.

Referring to FIG. 3 together with FIG. 6, a flow diagram illustrating various sub-processes of step S10 is provided. At process S10-1, modules 124 of design system 120 can calculate various scaling attributes of IC layout 10 which may affect the shape thermal conductances. One example scaling attribute in embodiments of the present disclosure can include the separation distance between adjacent FETs in IC layout 10 (i.e., transistors 12 (FIGS. 1, 2) separated only by electrically non-conductive space or components) and/or the voltage bias of each transistor 12 in IC layout 10. These attributes can be identified collectively and referred to herein as "local layout effects." The local layout effects of IC layout 10 relating to transistors 12 can increase the amount of self-heating in ICs manufactured with IC layout 10 during operation, e.g., because of transistors 12 being positioned close to each other and because of high power dissipated in each transistor 12. In another example, transistors 12 with sub-components (e.g., gates 16 (FIGS. 1, 2) and/or fins 18 (FIGS. 1, 2)) larger than a predetermined size can reduce the amount of self-heating in an IC. More specifically, the height of each fin 18, the width of each fin 18, spacing between fins in each transistor 12 of IC layout 10, and/or the thickness of a buried insulator layer (not shown) beneath substrate 30 (FIGS. 1, 2) can affect the shape thermal conductances in IC layout 10. In a third example, the properties of back end layer 32 (FIG. 2), also known as BEOL wiring features, can affect the shape thermal conductances, hence self-heating in an IC during operation. In back end layer 32, the number of vias 44 (FIG. 2), or width of contacts 14 (FIGS. 1, 2) positioned over gates 16 or source and drain contacts 34, 36 (FIG. 2) can increase the shape thermal conductances for transistors 12 in IC layout 10. Specifically, a larger number of vias 44 being connected to or included in IC layout 10 can increase the thermal conductivity of each corresponding transistor 12. Contacts 14 with widths exceeding a predetermined value or threshold can provide greater thermal conductivity and/or reduced electromigration, etc. At step S10-1, modules 124 can calculate one or more scaling attributes of IC layout 10, including without limitation any local layout effects, fin dimensions for transistors 12, and/or BEOL wiring features.

At step S10-2, modules 124 can compare one or more of the calculated scaling attributes with a corresponding scaling window. A scaling window, as used herein, refers to a range of minimum and/or maximum values used for determining whether to apply a scaling factor to the shape thermal conductances. More specifically, scaling attributes with values within a corresponding scaling window indicate that a particular scaling factor will not significantly affect the overall value of the shape thermal conductances for IC layout 10. By contrast, a scaling attribute being outside its corresponding scaling window can indicate that a scaling factor (i.e., a positive multiplier with a value greater than or less than approximately 1.0) can be applied to the shape thermal conductances of IC layout 10. Where a compared scaling attribute is within its corresponding scaling window (i.e., "yes" at step S10-2), the process flow can bypass step S10-3 of multiplying the shape thermal conductances by a scaling factor. Where a compared scaling attribute is outside its corresponding scaling window (i.e., "no" at step 10-2), the process flow can proceed to step S10-3 to multiply each of the shape thermal conductances by a scaling factor. For example, if a scaling window of the separation distance between adjacent transistors 12 can be between, e.g., 5.0 nm and 7.0 nm, a separation distance between adjacent transistors in IC layout 10 being approximately 6.0 nm (i.e., within the scaling window) will cause the flow to bypass step S10-3. A separation distance between adjacent transistors of approximately 4.4 nm (i.e., outside the scaling window) will cause the flow to proceed to step S10-3.

At step S10-3, in the event that the calculated value of a scaling attribute is not within a corresponding scaling window, modules 124 of design system 120 can multiply the shape thermal conductances for IC layout 10 by a scaling factor in step S10-3. Where the value of the scaling attribute(s) indicates a greater than expected thermal conductance, the scaling factor can be greater than 1.0. Conversely, where the value of the scaling attribute(s) indicates a lower than expected conductance, the scaling factor can be less than 1.0. In the example of BEOL wiring features, a count of fifty vias can indicate a lower than expected conductance where the scaling window is between one-hundred vias and two-hundred vias. Here, modules 124 can multiply the shape conductances by a factor of, e.g., approximately 0.75. In an alternative scenario, a count of three-hundred vias (i.e., more than the upper limit of the scaling window) can cause modules 124 to multiply the shape thermal conductances by a factor of, e.g., approximately 1.25 in step S10-3.

In any event, following the multiplying of each shape thermal conductance by a scaling factor in step S10-3 or bypassing step S10-3 altogether, the flow can proceed to step S10-4 of determining whether other scaling attributes can be applied to the shape thermal conductances. For instance, IC design program 106 and/or memory 112 of computing device 104 can include a listing of scaling attributes which may affect the value of shape thermal conductances for IC layout 10. Where the scaling attributes calculated in step S10-1 and used for comparison in step S10-2 represent only a subset of multiple scaling attributes, the flow may repeat steps S10-1, S10-2, and/or S10-3 for any other scaling attributes which have not been analyzed. Specifically, where local layout effects and fin dimensions have been previously tested but BEOL wiring effects remain untested (i.e., "yes" at step S10-4), the flow can return to step S10-1 to calculate scaling attributes for BEOL wiring effects. Where each relevant scaling attribute has been analyzed (i.e., "no" at step S10-4), the flow can proceed to step S2, for calculating an area term for IC layout 10 according to the general process flow discussed elsewhere herein. In the event that attributes of IC layout 10 are later modified in step S8, the various sub-processes of step S10 can also be repeated along with the other process steps shown in FIG. 5 for the modified IC layout, until the design of a temperature-compliant IC layout 10 is complete.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for designing a temperature-compliant integrated circuit (IC), the method comprising:

calculating a thermal resistance of an IC layout, the IC layout having an area-dependent thermal conductance, a gate thermal conductance, and a fin thermal conductance each based on a device geometry of a plurality of transistors in the IC layout, wherein the calculating includes:
   calculating an area term for the IC layout, the area term being a product of a number of transistor gates, a number of fins per transistor gate, and the area-dependent thermal conductance of the IC layout,
   calculating a perimeter term for the IC layout, the perimeter term being a product of the number of transistor gates and the gate thermal conductance of the IC layout, added to a product of the number of fins per transistor gate and the fin thermal conductance of the IC layout,
   calculating a thermal conductance of the IC layout as a sum of the area term and the perimeter term, and
   calculating the thermal resistance of the IC layout as an inverse of the thermal conductance;
calculating a self-heating temperature of the IC layout as directly proportional to the calculated thermal resistance;
comparing the self-heating temperature with a threshold temperature;
in response to the self-heating temperature exceeding the threshold temperature, automatically modifying the device geometry of the IC layout to reduce at least one of the area term and the perimeter term, thereby reducing the self-heating temperature of the IC layout;
designing the temperature-compliant IC layout by repeating the calculating and automatically modifying steps until the self-heating temperature does not exceed the threshold temperature; and
automatically fabricating, via an IC fabricator, an IC component having the temperature-compliant IC after the designing.

2. The method of claim 1, wherein the thermal resistance ($R_{th}$) is calculated according to an equation:

$$R_{th} = \frac{1}{G_{th}} = \frac{1}{(Nfin \cdot NF \cdot G_{thArea}) + ((Nfin \cdot G_{thNfin}) + (NF \cdot G_{thNF}))},$$

wherein $G_{th}$ represents the thermal conductance of the IC layout, Nfin represents the number of fins per transistor gate in the IC layout, NF represents the number of transistor gates in the IC layout, $G_{thArea}$ represents area-dependent thermal conductance of the IC layout, $G_{thNfin}$ represents the fin thermal conductance of the IC layout, and $G_{thNF}$ represents the gate thermal conductance of the IC layout.

3. The method of claim 1, wherein the calculating of the self-heating temperature further includes multiplying the thermal resistance by a product of the number of transistor gates, the number of fins per transistor gate, and a power dissipated in each fin.

4. The method of claim 1, wherein the calculating of the self-heating temperature ($\Delta T$) based on the thermal resistance is calculated according to an equation:

$$\Delta T = R_{th}(P_{diss,Fin} \cdot NF \cdot Nfin),$$

wherein $R_{th}$ represents the thermal resistance of the IC layout, $P_{diss,Fin}$ represents a thermal power dissipated in each fin, NF represents the number of transistor gates in the IC layout, and Nfin represents the number of fins per transistor gate in the IC layout.

5. The method of claim 1, wherein area-dependent thermal conductance, the fin thermal conductance, and the gate thermal conductance are at least partially derived from a local layout effect including a spacing between each adjacent FET in the IC layout and a voltage bias of each of each adjacent FET.

6. The method of claim 1, wherein the area-dependent thermal conductance, the fin thermal conductance, and the gate thermal conductance are each at least partially derived from one of a fin height and a fin width of each of the plurality of FETs in the IC layout.

7. The method of claim 1, wherein the area-dependent thermal conductance, the fin thermal conductance, and the gate thermal conductance are each at least partially derived from a back end of line (BEOL) wiring feature for the IC layout, the BEOL wiring feature being one of a total number of electrically connected vias and a metal contact layer width.

8. A system for designing a temperature-compliant integrated circuit (IC), the system comprising:
   logic configured to calculate a thermal resistance of an IC layout, the IC layout having an area-dependent thermal conductance, a gate thermal conductance, and a fin thermal conductance each based on a device geometry of a plurality of transistors in the IC layout, wherein the calculating includes:
      calculating an area term for the IC layout, the area term being a product of a number of transistor gates, a number of fins per transistor gate, and the transistor area-dependent thermal conductance of the IC layout, calculating a perimeter term for the IC layout, the perimeter term being a product of the number of transistor gates and the gate thermal conductance of the IC layout, added to a product of the number of fins per transistor gate and the fin thermal conductance of the IC layout,
      calculating a thermal conductance of the IC layout as a sum of the area term and the perimeter term,
      calculating the thermal resistance of the IC layout as an inverse of the thermal conductance,
      calculating a self-heating temperature of the IC layout as directly proportional to the calculated thermal resistance, and
      comparing the self-heating temperature with a threshold temperature;
   an IC layout editor for, in response to the self-heating temperature exceeding the threshold temperature, automatically modifying the device geometry of the IC layout to reduce at least one of the area term and the perimeter term, thereby reducing the self-heating temperature of the IC layout; and designing the temperature-compliant IC layout by causing the logic to repeat the calculating steps, and repeating the automatic modifying of the IC layout, until the self-heating temperature does not exceed the threshold temperature; and
   a fabricator for automatically manufacturing an IC component having the temperature-compliant IC layout.

9. The system of claim 8, wherein the logic is further configured to calculate the thermal resistance ($R_{th}$) according to an equation:

$$R_{th} = \frac{1}{G_{th}} = \frac{1}{(Nfin \cdot NF \cdot G_{thArea}) + ((Nfin \cdot G_{thNfin}) + (NF \cdot G_{thNF}))},$$

wherein $G_{th}$ represents the thermal conductance of the IC layout, Nfin represents the number of fins per transistor gate in the IC layout, NF represents the number of transistor gates in the IC layout, $G_{thArea}$ represents the area-dependent thermal conductance of the IC layout, $G_{thNfin}$ represents the fin thermal conductance of the IC layout, and $G_{thNF}$ represents the gate thermal conductance of the IC layout.

10. The system of claim 8, wherein the logic is further configured to calculate the self-heating temperature by multiplying the thermal resistance by a product of the number of transistor gates, the number of fins per transistor gate, and a power dissipated in each fin.

11. The system of claim 8, wherein the logic is further configured to calculate the self-heating temperature ($\Delta T$) based on the thermal resistance is performed according to an equation:

$$\Delta T = R_{th}(P_{diss,Fin} \cdot NF \cdot Nfin),$$

wherein $R_{th}$ represents the thermal resistance of the IC layout, $P_{diss,Fin}$ represents a power dissipated in each fin, NF represents the number of transistor gates in the IC layout, and Nfin represents the number of fins per transistor gate in the IC layout.

12. The system of claim 11, wherein the logic is further configured to derive the area-dependent thermal conductance, the fin thermal conductance, and the gate thermal conductance from a local layout effect including a spacing between each adjacent FET in the IC layout and a voltage bias of each of each adjacent FET.

13. The system of claim 11, wherein the logic is further configured to derive the area-dependent thermal conductance, the fin thermal conductance, and the gate thermal conductance from one of a fin height and a fin width of each of the plurality of FETs in the IC layout.

14. The system of claim 11, wherein the logic is further configured to derive the area-dependent thermal conductance, the fin thermal conductance, and the gate thermal conductance from a back end of line (BEOL) wiring feature for the IC layout, the BEOL wiring feature being one of a total number of electrically connected vias and a metal contact layer width.

15. A program product stored on a computer readable storage medium, the program product operative to design a temperature-compliant integrated circuit (IC) when executed, the computer readable storage medium comprising program code for:
   calculating a thermal resistance of an IC layout, the IC layout having an area-dependent thermal conductance, a gate thermal conductance, and a fin thermal conductance each based on a device geometry of a plurality of transistors in the IC layout, wherein the calculating includes:
      calculating an area term for the IC layout, the area term being a product of a number of transistor gates, a number of fins per transistor gate, and the area-dependent thermal conductance of the IC layout,
      calculating a perimeter term for the IC layout, the perimeter term being a product of the number of transistor gates and the gate thermal conductance of the IC layout, added to a product of the number of fins per transistor gate and the fin thermal conductance of the IC layout,
      calculating a thermal conductance of the IC layout as a sum of the area term and the perimeter term, and
      calculating the thermal resistance of the IC layout as an inverse of the thermal conductance;
   calculating a self-heating temperature of the IC layout as directly proportional to the calculated thermal resistance;
   comparing the self-heating temperature with a threshold temperature;

in response to the self-heating temperature exceeding the threshold temperature, automatically modifying the device geometry of the IC layout to reduce at least one of the area term and the perimeter term, thereby reducing the self-heating temperature of the IC layout;

designing the temperature-compliant IC layout by repeating the calculating and automatically modifying steps until the self-heating temperature does not exceed the threshold temperature; and instructing an IC fabricator to automatically fabricate an IC component having the temperature-compliant IC layout, after the designing.

16. The program product of claim 15, wherein the thermal resistance ($R_{th}$) is calculated according to an equation:

$$R_{th} = \frac{1}{G_{th}} = \frac{1}{(Nfin \cdot NF \cdot G_{thArea}) + ((Nfin \cdot G_{thNfin}) + (NF \cdot G_{thNF}))},$$

wherein $G_{th}$ represents the thermal conductance of the IC layout, Nfin represents the number of fins per transistor gate in the IC layout, NF represents the number of transistor gates in the IC layout, $G_{thArea}$ represents the area-dependent thermal conductance of the IC layout, $G_{thNfin}$ represents the fin thermal conductance of the IC layout, and $G_{thNF}$ represents the gate thermal conductance of the IC layout.

17. The program product of claim 15, wherein the calculating of the self-heating temperature further includes multiplying the thermal resistance by a product of the number of transistor gates, the number of fins per transistor gate, and a power dissipated in each fin.

18. The program product of claim 15, wherein the area-dependent thermal conductance the fin thermal conductance, and the gate thermal conductance are at least partially derived from a local layout effect including a spacing each adjacent FET in the IC layout and a voltage bias of each adjacent FET.

19. The program product of claim 15, wherein the area-dependent thermal conductance the fin thermal conductance, and the gate thermal conductance are each at least partially derived from one of a fin height and a fin width of each of the plurality of FETs in the IC layout.

* * * * *